United States Patent
Tsuji

(10) Patent No.: US 6,455,594 B1
(45) Date of Patent: Sep. 24, 2002

(54) METHOD FOR PRODUCING PLATINUM COLLOID, AND PLATINUM COLLOID PRODUCED BY THE SAME

(75) Inventor: Hirofumi Tsuji, Tokyo (JP)

(73) Assignee: Yokohama Town Service Co., Ltd., Yokohama (JP)

( * ) Notice: Subject to any disclaimer, the term of this patent is extended or adjusted under 35 U.S.C. 154(b) by 62 days.

(21) Appl. No.: 09/657,222

(22) Filed: Sep. 7, 2000

(30) Foreign Application Priority Data

Sep. 13, 1999 (JP) .......................................... 11-259356

(51) Int. Cl.$^7$ ................................................ B01F 17/42
(52) U.S. Cl. ............................ 516/97; 75/722; 424/649
(58) Field of Search ........................ 516/97; 106/1.21; 75/722; 502/339

(56) References Cited

U.S. PATENT DOCUMENTS

| | | | | |
|---|---|---|---|---|
| 1,629,161 A | * | 5/1927 | Herrmann et al. ............. | 516/97 |
| 2,806,798 A | * | 9/1957 | Weaver .................... | 516/97 X |
| 2,902,400 A | * | 9/1959 | Moudry et al. ............ | 516/97 X |
| 3,470,019 A | * | 9/1969 | Steele ..................... | 502/339 X |
| 3,992,512 A | * | 11/1976 | Petrow et al. ............. | 516/97 X |
| 4,261,747 A | * | 4/1981 | Feldstein ................... | 516/97 X |
| 4,425,261 A | * | 1/1984 | Stenius et al. ......... | 106/1.21 X |
| 4,652,311 A | * | 3/1987 | Gulla et al. ............... | 516/97 X |
| 5,275,998 A | * | 1/1994 | Tsurumi et al. ............. | 502/339 |

* cited by examiner

*Primary Examiner*—Richard D. Lovering
(74) *Attorney, Agent, or Firm*—Kanesaka & Takeuchi

(57) ABSTRACT

A platinum colloid is formed by reducing platinum ions by agitating a treatment solution, while controlling temperature of the treatment solution under a reductive atmospheric condition. The solution contains one part of capacity of a platinum chloride acid solution, 400 to 500 parts of capacity of water, a non-ion based surface-active agent in an amount of 0.2 to 2 times with respect to an amount of the platinum chloride acid solution, a reducing agent in an amount of 40 to 60 times with respect to the amount of the platinum cloride acid solution, and a Ph compensating agent in an amount of 10 to 30 times with respect to the amount of the platinum chloride acid solution if the concentration thereof is 5%, to thereby adjust pH of the treatment solution to neutral or weak alkalinity.

5 Claims, 2 Drawing Sheets

METHOD FOR PRODUCING PLATINUM COLLOID, AND PLATINUM COLLOID PRODUCED BY THE SAME

BACKGROUND OF THE INVENTION, AND DESCRIPTION OF THE RELATED ART

The present invention relates to a method for producing stabilized and highly activated platinum colloid, and highly activated platinum colloid produced by the same method.

The method for producing metallic colloid is largely classified into a physical method and a chemical method. The physical method is called a "burning method". In the burning method, a metallic ion solution is inputted into a hydrogen gas or phosphor to perform a reduction reaction, and thereafter the solution is heated by burning to foster the reaction, whereby generated metallic corpuscles are received in a liquid dispersion medium, and, after the reduction is completed, the metallic colloid is treated to be well stabilized, using a surface-active agent.

Contrarily, the chemical method is called a "deposition method" (metallic salt reduction reaction method). The chemical method is such that, after metal oxide and metal deposition are generated from a metallic ion solution, by utilizing a chemical reaction, a surface-active agent is doped to obtain metallic colloid.

However, when using the burning method, metallic corpuscles are precipitated in a burner, and the jetting portion of the burner is clogged due to precipitated metallic particles, wherein there is a problem or a shortcoming in that the burner cannot be used for a long period.

On the contrary, in the deposition method, by precious metal salt being reduced and treated in a water solution under the existence of a surface-active agent, precious metal hydrosol or precious metal sol, which is metallic colloid, is generated (Japanese Laid-Open Patent Application No. 12024 of 1984, Prior art (1)). The deposition method is a more rational method than the burning method.

However, in the prior art deposition method, metallic hydrosol of high concentration cannot be obtained in a water solution. The reason is not necessarily made clear. It seems that a problem resides in the treatment method.

In order to solve these problems, Japanese Laid-Open Patent Application No. 68008 of 1998 (Method for producing high activated metallic corpuscles) (Prior art (2)) proposed a method for stabilizing the colloid state of metallic colloid by reducing and reacting metallic ions, without always depending on a surface-active agent.

That is, the method of the prior art (2) is a method for producing highly activated metallic corpuscles, by which metallic corpuscles are precipitated in a metallic ion solution by treating and reducing the solution with a reducing agent doped to the solution while controlling the temperature and pH. The temperature of the solution is usually controlled at a higher temperature while being in a range from 20° C. through 80° C. during the reaction, and the pH is kept in a range from 4 through 11, wherein the reduction treatment does not depend on any surface-active agent (protective colloid), and the metallic ions are reduced to be kept in a colloid state.

Also, when using a surface-active agent, it was doped for only the purpose of suppressing the excessive growth of metallic corpuscles precipitated from the surface-active agent.

However, when using the method of the prior art (2), the amount of metallic colloid that can be generated is not quantitative, there is still a shortcoming in that the production loss is considerable. Also, the obtained metallic colloid itself is not stable. It may be liable to become flocculated. Therefore, it was difficult to produce metallic colloid of high concentration in a stabilized manner.

It is considered that there is a large misunderstanding in that, although a surface-active agent is used in a conventional production method using the deposition method, the surface-active agent (protective colloid) has been regarded to prevent the produced metal from becoming flocculated or to deflocculate the same in the conventional method.

It is therefore an object of the invention to provide a method for producing metallic colloid, by which metallic colloid of high concentration can be obtained while using the conventional deposition method in which a metallic ion solution is reduced and treated in a liquid dispersion medium.

SUMMARY OF THE INVENTION

In order to achieve the object, a method for producing metallic, i.e. platinum, colloid according to the invention is a method for producing metallic colloid by reducing metallic ions by agitating a treatment solution, in which a surface-active agent is added to water and to which a metallic ion solution and a pH compensating agent are doped, while controlling the temperature of the treatment solution, under a reductive atmosphere, wherein in a case where water is used with a capacity ratio of 400 through 500 parts with respect to a metallic ion solution whose capacity is 1 part, the surface-active ion solution is a non-ion based surface-active agent, the amount of doping of the non-ion surface-active agent is 0.2 through 2 times with respect to that of the metallic ion solution, the amount of doping of a reducing agent is 40 through 60 times with respect to that of the metallic ion solution, and the pH compensating agent is to adjust the pH of the treatment solution to neutral or weak alkalinity, wherein the amount of doping of the pH compensating agent is set in a range from 10 through 30 times with respect to that of the metallic ion solution if the concentration thereof is 5%.

Also, the pH compensating agent and metallic ion solution are simultaneously doped into the treatment solution.

In addition, the reducing agent is to foster the reduction and reaction of the metallic ion solution. After the reducing agent is doped to the treatment solution and a reductive atmosphere is formed in the treatment solution, the temperature of the treatment solution is further raised, and after the temperature reaches a fixed temperature level, the metallic ion solution and pH compensating agent are doped.

Further, the reducing agent is to foster the reduction and reaction of the metallic ion solution. After the temperature of the treatment solution is raised and reaches a fixed temperature level, the metallic ion solution and pH compensating agent are doped. After that, by doping the reducing agent, a reductive atmosphere is formed in the treatment solution.

Further, the metallic colloid according to the invention is a metallic colloid produced by the method for producing metallic colloid, where the metallic colloid is platinum colloid, ethanol is used as the reducing agent, polysorbate 80 is used as the surface-active agent, a platinum chloride acid solution is used as the metallic ion solution, and sodium bicarbonate is used as the pH compensating agent, and the oxidization reduction potential shows 400 mV or more in the form of a negative value.

DETAILED DESCRIPTION OF THE INVENTION

Figure 1:
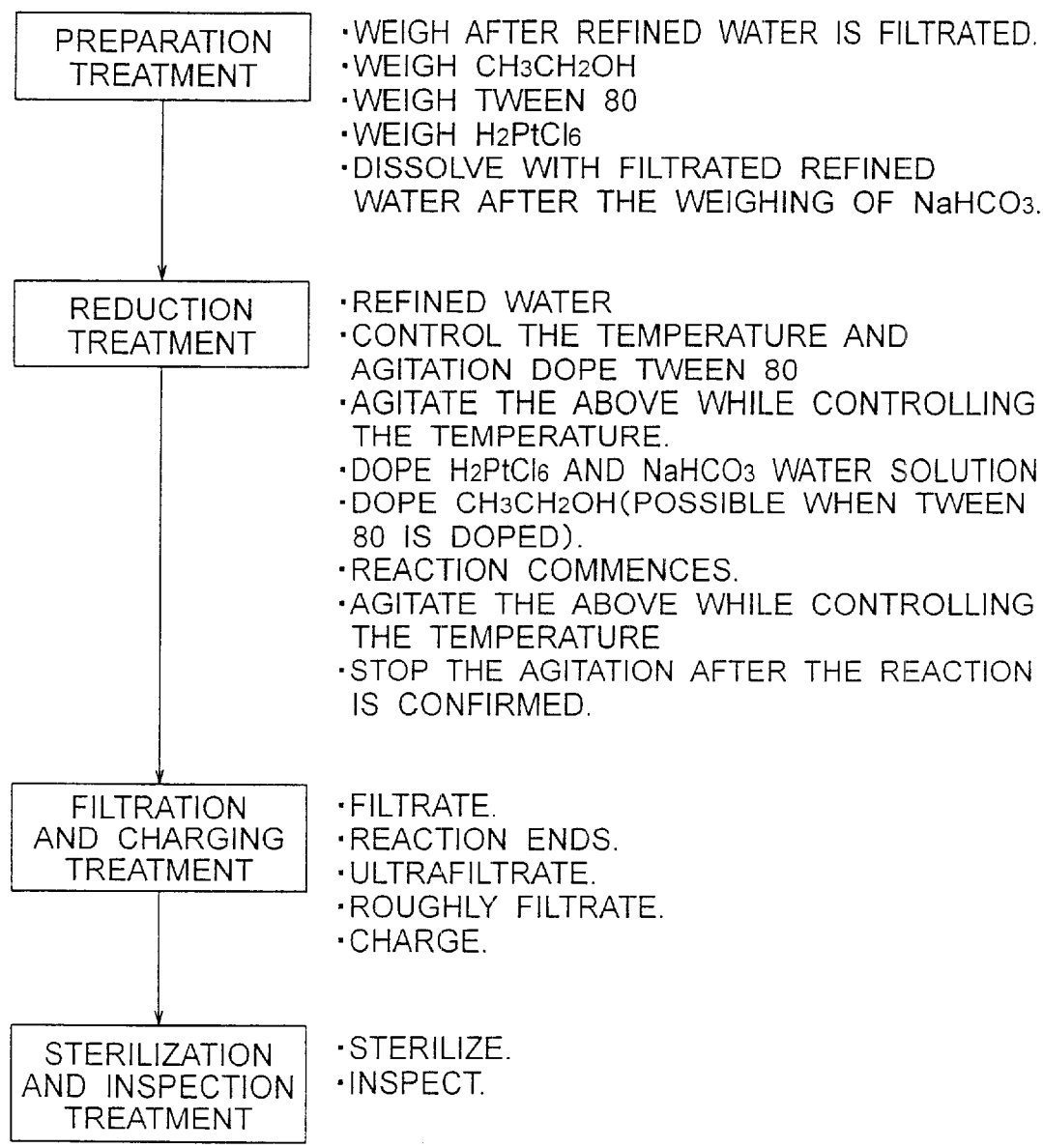
FIG. 1 is a block diagram showing the flow of a process for producing a metallic colloid according to the invention.

Hereinafter, a description is given of the present invention. The invention sequentially carries out a reduction process and a filtrating process.

According to experiments made by the inventor, in order to produce a high concentration metallic colloid in a stabilized state, it is important that a reducing agent and a pH compensating agent are well balanced and adjusted with respect to water, including a surface-active agent (protective colloid), and a reduction treatment of metallic ions is carried out, and it was found that adjustment of the amounts of doping ethanol as the reducing agent and sodium bicarbonate as the pH compensating agent is indispensable to maintain the stability of colloid.

Prior to a reduction treatment, the treatment solution is adjusted. Water (in which impurities are removed from refined water by filtration) provided as a treatment solution blended with metallic ion colloid (in the case of platinum, platinum chloride acid solution), a surface-active agent (non-ion based surface-active agent) doped to water, a reducing agent (Alcohol, etc.,) and a pH compensating agent (Alkali metal group) are prepared. It is important to adjust the amounts of respective constituents of a treatment solution blended with the metallic ion solution.

Further, it is assumed that metallic ions are contained in the metallic ion solution at a one-fifth ratio in terms of the capacity ratio. In a case where water of 400 through 500 parts is used as the base of a treatment solution with respect to the metallic ion solution of 1 part, the amount of doping of a surface-active agent (non-ion based surface-active agent) is 0.2 through 2 times the amount of the metallic ion solution, the amount of doping of the reducing agent is 40 through 60 times the amount of the metallic ion solution, and the amount of the pH compensating agent is set in a range from 10 through 30 times the amount of the metallic ion solution if the concentration thereof is 5%.

The more the amount of doping of the surface-active agent is increased in a treatment solution, the more the surface-active agent is liable to be flocculated. On the contrary, as the amount of doping of the surface-active agent is decreased, metallic colloid generated in the treatment solution is likely to be deposited in the liquid.

The reason why the amount of doping of the surface-active agent is set to 0.2 through 2 times that of the metallic ion solution is that the amount is determined in connection with the doped amounts of a reducing agent and a pH compensating agent. This is the same with respect to the reducing agent and pH compensating agent.

Needless to say, the reducing agent is to foster the reduction reaction of the metallic ion solution, and in case where the doped amount thereof is more than or less than a range from 40 through 60 times the amount of the metallic ion solution, the generated metallic colloid is likely to be deposited.

The pH compensating agent is to adjust the pH of the treatment solution, which becomes acid by doping the metallic ion solution, to neutral or weak alkalinity. Therefore, the pH compensating agent is doped to the treatment solution simultaneously along with the metallic ion solution. In cases where the doped amount of the pH compensating agent is more than or less than the range from 10 through 30 times the amount of the metallic ion solution, the generated metallic colloid is likely to be deposited.

In this connection, if the amount of water is greater than the amount of metallic ion solution, the concentration of the metallic ion solution, reducing agent and pH compensating agent in the water is accordingly reduced, and a problem arises in the stability of the colloid state of metallic colloid generated in the treatment solution. (Reduction processing temperature is in the range of 60–80° C., but about 70° C. is desirable.)

(A) Reduction Treatment

The reduction treatment is to reduce the metallic ions in water (filtrated refined water). When carrying out the treatment, first, the temperature is raised while agitating the water, and after the temperature reaches a fixed level, a surface-active agent and a reducing agent are doped into the water, and a metallic ion solution and a pH compensating agent are next doped into the treatment water, wherein the metallic ions contained in the metallic ion solution are reduced by causing the reducing agent to act, and metallic colloid is generated in the treatment solution.

By controlling the amount of the surface-active agent doped to 0.2 through 2 times the amount of the metallic ion solution with respect to the refined water when doping the surface-active agent and reducing agent into the treatment solution, stability of the generated metallic colloid can be acquired.

In addition, the reduction reaction of the metallic ion solution is promoted by the doping of the reducing agent. The timing of doping of a metallic ion solution is important. That is, the temperature of the treatment solution is further raised, and after it reaches a fixed level, the metallic ion solution is doped.

The pH compensating agent is doped, in order to adjust the pH of the treatment solution, simultaneously with the doping of the metallic ion solution. Maintaining agitation with the temperature of the treatment solution, to which the metallic ion solution is doped, is retained at a fixed level, heating and agitation of the treatment solution are stopped at the moment when the metallic ions are reduced (that is, the moment when the liquid color turns into black in the case of platinum), whereby a metallic colloid can be acquired in the treatment solution.

As described above, in the embodiment, although the metallic ion solution is doped after a reductive atmosphere is formed in the treatment solution by inputting a reducing agent and a pH compensating agent into the treatment solution, the reductive atmosphere may be formed in the treatment solution by doping the reducing agent after the metallic ion solution and pH compensating agent are doped into the treatment solution after the temperature of the treatment solution is raised, a surface-active agent is inputted therein, and the temperature reaches a fixed level. In this case, the treatment solution is made to wait in the reductive atmospheric condition, whereby if the metallic ion solution is doped, the reduction reaction is immediately commenced and promoted.

(B) Filtrating Treatment

The filtrating treatment is a process to prevent foreign substances such as dusts from being mixed with metallic colloid. In the filtrating treatment, a treatment solution including metallic colloid is filtrated and is made to rest to confirm the completion of the reduction reaction, wherein the liquid color is checked (in the case of platinum, black). Subsequently, in order to remove and deionize low molecular ions other than metallic colloid, ultrafiltration is executed while doping refined water into the treatment solution. Thereafter, after re-filtration is performed, the treatment solution is charged into a vessel.

After a sterilization process is carried out as the final treatment, the treatment solution is inspected, and then it is made into the product. In the invention, by reducing metallic ions while causing a surface-active agent (non-ion based surface-active agent) to act on the metallic ions, the colloid state of metallic colloid generated in the liquid can be maintained in a stable state.

FIG. 1 shows a flow of the above series of processes, using a block diagram.

[Embodiment 1] Hereinafter, a description is given of an embodiment of the invention.

(1) Preparation of Treatment Water

[Water A]

Refined water is filtrated using a filter paper whose mesh is 1 μm, and 4,300 ml was prepared.

[Reducing agent B]

Using ethanol ($CH_3CH_2OH$), 500 ml was measured.

[Surface-active agent C]

Polysorbate 80 (Tween 80) was selected, and 5 ml was measured.

[Metallic ion solution D]

Platinum chloride acid solution ($H_2PtCl_6$) was prepared, and 10 ml of the platinum chloride acid solution (including Pt by 2 grams) was measured.

[pH compensating agent E]

10 grams of sodium bicarbonate ($NaHCO_3$) was prepared, and 10 grams of the sodium bicarbonate ($NaHCO_3$) was dissolved in 200 ml of filtrated refined water.

(A) Reduction Treatment

The abovementioned water A was poured into a vessel as a treatment solution, and the temperature thereof was raised while agitating it. At the moment when the water temperature reached 60° C., the reducing agent B and surface-active agent C were doped into the water A. After the reducing agent B and surface-active agent C were doped, the water temperature was further raised while agitating it. When the temperature of the treatment solution reached 70° C., the metallic ion solution D and pH compensating agent E were simultaneously doped thereinto.

While keeping the temperature at 70° C., the agitation of the treatment solution was continued, and at the moment when the metallic ions were reduced, the agitation and heating were stopped, thereby acquiring metallic colloid.

(B) Filtration Treatment

After the agitation treatment was finished, metallic colloid was filtrated by using filter paper with a 1 μm mesh, and it was left to sit for 12 hours. After sitting, filtration was carried out by an ultrafiltration film whose differential molecular weight is 10,000, while adding refined 8,000 ml of water, thereby obtaining metallic colloid. Further, re-filtration was executed by using a filter paper whose mesh is 1 μm. The liquid was classified and poured into product vessels.

Finally, after the temperature of the product vessels was raised to 85° C. as a production process, and sterilization was performed for ten minutes, a product inspection was carried out.

According to the invention, it was found that, by doping the reducing agent and pH compensating agent, including the surface-active agent, to the treatment solution (water) in a well-balanced state, the metallic colloid generated in the treatment solution is activated, and is also stabilized.

It is considered that the reasons why the metallic colloid obtained by the method according to the invention is highly active and has excellent stability are due to the following causes: that is, in the metallic colloid, increments of the interfacial energy between particles and water must be supplemented from the outside in line with an increase in the phase boundary area, which occurs due to the generation of the metallic colloid. At this time, since the interfacial energy is decreased due to adsorption of a surface-active agent onto the phase boundary if the surface-active agent exists, the dispersion system can accordingly be generated easily.

Also, since the layer on which a surface-active agent is adsorbed surrounds corpuscles with its hydrophilic group oriented to water, it is possible to prevent corpuscles from being buffed by the repulsive force of an electric charge between corpuscles and a hydrate layer.

Since the non-ion surface-active agent does not have any electric charge, it does not influence the electric charge of the generated metallic colloid, but it makes the most of the electric charge which the metallic colloid has. The surface-active agent itself is composed of a hydrophobic group and a hydrophilic group, and the non-ion surface-active agent is a substance that is not electrolytically dissociated when being dissolved in water, wherein a hydrate group and an ether group are designed to be very macromolecular in order to increase the hydrophilicity thereof since the hydrophilicity is weak.

This leads to the fact that as the concentration of the non-ion surface-active agent in the metallic colloid exceeds a certain range, these macromolecules rather increase the interfacial energy of the colloid particles and hinder the stability.

In the invention, the functions of such a surface-active agent and physical properties of the metallic colloid are well utilized, the generated colloid is surrounded as soon as the metallic colloid is generated, wherein it can be considered that it becomes possible to produce well-stabilized metallic colloid.

Colloid particles are frequently brought into collision with each other due to Brownian movement, etc., but in a stabilized colloid solution, a cause exists, which hinders the combination of particles when the particles are brought into collision with each other.

The cause is that the colloid particles are electrically charged, and the colloid particles are hydrated by being combined with a dispersion medium. The metallic colloid is surrounded by the surface-active agent and is hydrated as described above, but the reason why the colloid particles are electrically charged can be understood by the following fact.

It is already known that, since a substance has a very large interfacial energy as the substance becomes an amicron (nanometer=10 Å) consisting of several through several hundreds of aggregates in the form of the number of atom/molecules, remarkable changes arise in the physical and chemical properties thereof. However, these corpuscles are negatively (−) or positively (+) electrically charged by adsorption of the rear polar group and ions of the metallic colloid.

Figure 2:
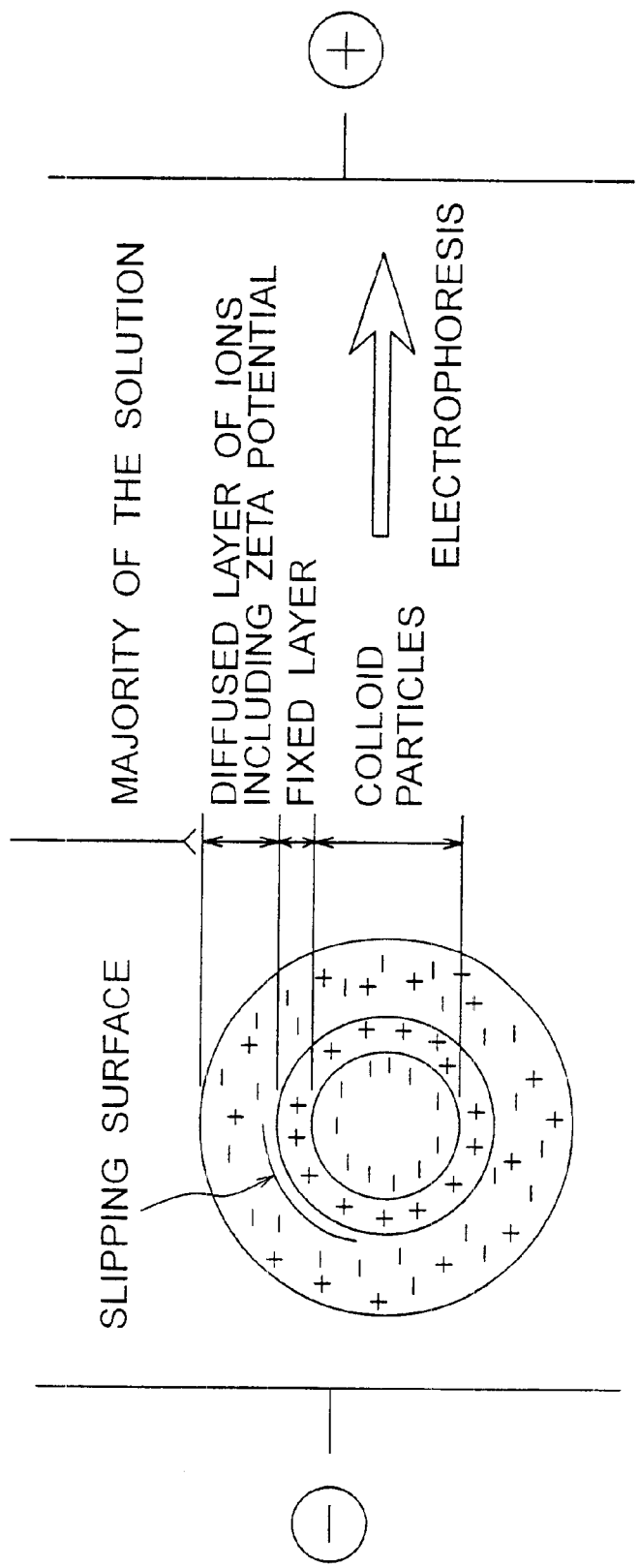
FIG. 2 is an exemplary view of an electric double layer that is constituted by colloid particles.

FIG. 2 is a view to explain the principle of the electrophoresis light-scattering method. In FIG. 2, as platinum colloid is dispersed in a solution, platinum colloid, having the negative (−) electric charge, ion-dissociates the solution around the particles, and forms an electric double layer of positive (+) and negative (−) equivalence such as a H+ group, OH− group and COOH− group, etc., wherein, in order to neutralize the interfacial electric charge, excessive positive (+) ions and slight negative (−) ions are diffused and distributed, thereby causing a fixed layer to be produced around the particles.

The electric double layer is formed of equivalent ions, wherein since excessive negative (−) ions and slight positive (+) ions are diffused and distributed at the circumferential portion of the diffusion layer, the electric behavior is based on the negative (−) electric charge. The zeta (ζ) potential (electrokinetic potential), which is generated on the slip surface near the boundary face between the fixed layer and diffusion layer and measured by the electrophoresis light-scattering method, in platinum colloid produced by the method according to the invention is in the order of approx. −20 mV.

That is, it is considered that the solution around platinum colloid has a negative (−) electrode having a voltage of in the order of −20 mV. In the case where these particles are drawn near each other, as the electric double layer that surrounds respective particles begins overlapping, the particles cannot be combined with each other due to the operation of electrostatic reactions.

Also, if particles are hydrated by being combined with, for example, water particles, the particles are isolated from each other by a layer of water particles, and are not directly brought into contact with each other. Therefore, no secondary particles can be produced. It can be said that the abovementioned two factors are related to stabilization of metallic colloid.

The point that metallic colloid produced by the method according to the invention is more active and yet more stabilized than the metallic colloid produced by the prior art method (Prior art example (2)) is proven by the following test.

To verify the activation of the platinum colloid produced by the embodiment example, a reaction decomposition test of hydrogen peroxide ($H_2O_2$) was carried out. According to the results, in the platinum colloid produced by the method of the invention, it was possible to decompose hydrogen peroxide ($H_2O_2$) at a speed faster by four times than that of the platinum colloid produced by the prior art example (2). Further, although the platinum colloid produced by the method of the invention shows a decomposition reaction after the reaction decomposition tests were continuously carried out fifty times and no deposition of the colloid was found, it was confirmed in the prior art example (2) that, although the decomposition reaction could be observed, the colloid was deposited.

The oxidization reduction potential in the treatment solution in which a reduction reaction is progressing in the embodiment was measured. The results of the measurement are shown in Table 1 below.

TABLE 1

| Elapse time of reaction (Hrs:Min) | Oxidization reduction potential (ORP) | Color of the surface of the solution | Color in the solution | Remarks |
|---|---|---|---|---|
| After 0:10 | +64 mV | Light yellowish gold | Light yellow | After the metallic ion solution and pH compensating agent was doped. |
| After 4:30 | ±0 mV | Gold brown | Light yellowish gold | |
| After 5:00 | −65 mV | Brown | Gold brown | |
| After 5:30 | −160 mV | Black | Brown | |
| After 6:00 | −406 mV | Black | Black | After the agitation |
| After the filtration treatment | −415 mV | | | |

The state where an electric double layer is formed in metallic particles and the layer is made into colloid, that is, the state where an electric double layer is gradually formed in metallic particles was found from Table 1 above. First, although the potential of the platinum solution and of the treatment solution after a pH compensating agent was doped was +64 mV, the potential is turned to negative (−) potential in line with the progress of a reduction reaction, wherein the value thereof is increased. When an electric double layer is formed in particles, an electrostatic repulsive force operates among metallic particles, and the metallic particles do not combine together.

The higher the potential is in any case where the electric charge of the particles is positive (+) or negative (−), the more the metallic colloid becomes stabilized. However, according to the embodiment, the oxidization reduction potential is of a negative electric charge and is −406 mV or less. Further, after the filtration is over, a value of −415 mV can be obtained. Based on Table 1, judging from that, with platinum colloid produced by the method according to the invention, a value of 400 mV or more in the form of a negative (−) value can be obtained, it can be understood that platinum colloid according to the invention is highly active.

Also, not only is the platinum colloid produced by the method according to the invention highly active and well stabilized, but also no special chemical agent is used in the materials used in the production processes, wherein the platinum colloid is produced of only edible materials as determined by the Japanese Pharmaceutical Standards. Therefore, it can be used as a foodstuff additive, and can be applied to foods, cosmetics, medicines, and peripheral agents outside of the medicine.

As described above, according to the invention, a reducing agent and a ph compensating agent, including a surface-active agent, are well-balanced and doped to water, and metallic ions are reduced while causing the surface-active agent (non-ion surface-active agent) to operate on a metallic ion solution, and further the temperature of the treatment solution and timing of doping of the surface-active agent, reducing agent and ph compensating agent with respect to the metallic ion solution are adjusted, whereby it becomes possible to produce metallic colloid that is highly active and well-stabilized.

What is claimed is:

1. A method for producing platinum colloid, comprising:
   reducing platinum ions by agitating a treatment solution while controlling temperature of said treatment solution under a reductive atmospheric condition, said treatment solution containing one part of capacity of a platinum chloride acid solution, 400 to 500 parts of capacity of water, a non-ion based surface-active agent in an amount of 0.2 to 2 times with respect to an amount of the platinum chloride acid solution, a reducing agent in an amount of 40 to 60 times with respect to the amount of the platinum chloride acid solution, and a pH compensating agent in an amount of 10 to 30 times with respect to the amount of the platinum chloride acid solution if a concentration thereof is 5%, to thereby adjust pH of the treatment solution to neutral or weak alkalinity.

2. A method for producing platinum colloid as set forth in claim 1, wherein said pH compensating agent and platinum chloride acid solution are simultaneously added into the water.

3. A method for producing platinum colloid as set forth in claim 1, wherein said reducing agent is to foster a reduction reaction of said platinum chloride acid solution, and said platinum chloride acid solution and pH compensating agent are added after a reductive atmospheric condition is formed in the treatment solution by adding the reducing agent into the treatment solution and after a temperature of the treatment solution reaches a fixed temperature level by raising that of the treatment solution.

4. A method for producing platinum colloid as set forth in claim 1, wherein said reducing agent is to foster a reduction reaction of said platinum chloride acid solution, and the reductive atmospheric condition is formed in the treatment solution by adding the reducing agent after raising a temperature of the treatment solution and adding the metallic ion solution and pH compensating agent after the temperature thereof reaches a fixed temperature level.

5. Platinum colloid produced by the method for producing platinum colloid of claim 1, where said reducing agent is ethanol, said surface-active agent is polysorbate 80, and said pH compensating agent is sodium bicarbonate, and an oxidization reduction potential shows 400 mV or more in a form of a negative value.

* * * * *